United States Patent
Glueck

(10) Patent No.: US 7,658,547 B2
(45) Date of Patent: *Feb. 9, 2010

(54) RADIAL ROLLER BEARING COMPRISING HOLLOW SPACER ROLLERS OF SHAPE MEMORY ALLOY

(75) Inventor: Stefan Glueck, Niederwerrn (DE)

(73) Assignee: Schaeffler KG, Herzogenaurach (DE)

( * ) Notice: Subject to any disclaimer, the term of this patent is extended or adjusted under 35 U.S.C. 154(b) by 449 days.

This patent is subject to a terminal disclaimer.

(21) Appl. No.: 11/718,934

(22) PCT Filed: Nov. 4, 2005

(86) PCT No.: PCT/DE2005/001976

§ 371 (c)(1),
(2), (4) Date: May 9, 2007

(87) PCT Pub. No.: WO2006/050697

PCT Pub. Date: May 18, 2006

(65) Prior Publication Data

US 2008/0037923 A1   Feb. 14, 2008

(30) Foreign Application Priority Data

Nov. 9, 2004   (DE) .................. 10 2004 053 936

(51) Int. Cl.
   *F16C 43/06* (2006.01)
   *F16C 33/30* (2006.01)
(52) U.S. Cl. .............. 384/559; 384/553; 384/492; 384/493; 384/548
(58) Field of Classification Search ......... 384/461–462, 384/491–492, 513, 521–522, 551–553, 559, 384/565–569, 903, 548, 493
See application file for complete search history.

(56) References Cited

U.S. PATENT DOCUMENTS

| 837,830 | A | * | 12/1906 | Heinkel et al. ............... 384/551 |
| 1,494,638 | A | | 5/1924 | Sheldon |
| 3,123,413 | A | | 3/1964 | Heim |
| 4,324,441 | A | * | 4/1982 | Rouverol et al. ............ 384/492 |
| 4,744,678 | A | * | 5/1988 | Fickelscher ................. 384/461 |
| 4,858,293 | A | | 8/1989 | Rosenzweig et al. |
| 5,033,877 | A | | 7/1991 | Bowen et al. |
| 5,092,898 | A | * | 3/1992 | Bekki et al. ............... 623/22.16 |
| 5,116,156 | A | * | 5/1992 | Landi ......................... 401/208 |

(Continued)

FOREIGN PATENT DOCUMENTS

DE   452475   11/1927

(Continued)

*Primary Examiner*—Marcus Charles
(74) *Attorney, Agent, or Firm*—Lucas & Mercanti, LLP

(57) ABSTRACT

The invention relates to a radial roller bearing, having an outer bearing ring and an inner bearing ring, and rolling bodies located between the rings. Some of the rollers are formed by individual hollow rollers of a shape memory alloy. The cross-section of the shape memory alloy rollers is deformed during the assembly of the radial roller bearing to fit the dimensions of the free space between the rims of the rings. The rollers are introduced into the radial roller bearing through the free space between the rims of the bearing rings. After introduction into the radial roller bearing and once they have reached a specific temperature, the rollers independently regain their original shape.

4 Claims, 1 Drawing Sheet

U.S. PATENT DOCUMENTS

| | | |
|---|---|---|
| 5,630,671 A | 5/1997 | Larson et al. |
| 2004/0101225 A1 | 5/2004 | Del Rio et al. |

FOREIGN PATENT DOCUMENTS

| | | | |
|---|---|---|---|
| DE | 101 20 489 A | | 11/2002 |
| DE | 102 14 468 A | | 10/2003 |
| GB | 407 375 A | | 3/1934 |
| JP | 03107659 A | * | 5/1991 |
| JP | 06200933 A | * | 7/1994 |

* cited by examiner

RADIAL ROLLER BEARING COMPRISING HOLLOW SPACER ROLLERS OF SHAPE MEMORY ALLOY

FIELD OF THE INVENTION

The invention relates to a radial roller bearing, in particular a cylindrical or needle roller bearing, which consists essentially of an outer bearing ring and of an inner bearing ring and also of a number of roller rolling bodies which are arranged between the bearing rings and which roll on raceways, delimited laterally in each case by two continuous rims, of the outer bearing ring and of the inner bearing ring and are guided at uniform distances from one another by means of a cage.

BACKGROUND OF THE INVENTION

A radial roller bearing of this type is already known generically, for example, from German patent specification No. 452 475. Such a radial roller bearing, which has a lateral delimitation of the raceways by rims both on its outer and on its inner bearing ring, is distinguished by a high load-bearing capacity and, in addition to high radial forces, can also absorb high axial forces in both directions. However, since these rims are designed as peripherally continuous rims connected in one piece to the bearing rings, it is not possible, as a consequence of construction, to fill the radial roller bearing completely with the corresponding cylindrical rollers without interspaces. The filling of this radial roller bearing with cylindrical rollers consisting of a rolling bearing steel must therefore be carried out in such a way that the two bearing rings are first arranged eccentrically with respect to one another and, subsequently, the free sickle-shaped space occurring between the bearing rings is filled with the cylindrical rollers. Thereafter, utilizing the elasticity of the two bearing rings, the inner bearing ring is brought, between the first and the last cylindrical roller, into the position concentric with respect to the outer bearing ring, and the cylindrical rollers are distributed uniformly on the circumference of their raceways. In order for the cylindrical rollers, even under load, to be always at a uniform distance from one another, finally, two part rings, into which corresponding half-pockets are worked on one side in the shape of the cylindrical rollers, are then inserted from both sides of the radial roller bearing, through the free space between the rims of the outer bearing ring and the rims of the inner bearing ring, into the radial roller bearing and are connected to one another by riveting to form a cage.

Such a radial roller bearing has the disadvantage, however, that its cage requires relatively high outlay in manufacturing and assembly terms and therefore increases the production costs of the bearing. It has likewise proven to be a disadvantage that the cylindrical rollers rolling on their raceways run up in their cage pockets against the cage arranged stationarily in relation to the cylindrical rollers, and this may result in increased frictional wear both on the cylindrical rollers and on the cage, the consequence of which may be an undesirable leading or trailing of the cylindrical rollers out of their desired position, even amounting to the jamming of the radial roller bearing. Moreover, since radial roller bearings of this type are subjected to high radial load and therefore have a relatively high radial play outside the load zone of the bearing, the result of an increased pocket play, in conjunction with this radial play, is that the cylindrical rollers are drawn with impact into the load zone of the bearing and then transmit these impacts to the other cylindrical rollers of the bearing via the cage. An out-of-round running of the radial roller bearing thus occurs, due to which the wear on the cylindrical rollers and on the cage is further intensified and, ultimately, the useful life of the radial roller bearing is greatly reduced.

Another possible way of guiding the cylindrical rollers of a radial roller bearing, which has a lateral delimitation of the raceways by means of rims both on its outer and on its inner bearing ring, by means of a cage has also already been disclosed by U.S. Pat. No. 837,830. In this radial roller bearing, the cage for the cylindrical rollers is formed by individual hollow intermediate pieces of triangular cross section, the length and width of which correspond approximately to the length and diameter of the cylindrical rollers and which are elastically deformable in width because one of their legs is designed to be separated longitudinally in the axial direction. After the bearing is filled with the cylindrical rollers and after the uniform alignment of these, these intermediate pieces are inserted in compressed form into the radial roller bearing through the free space between a rim of the outer bearing ring and a rim of the inner bearing ring, in each case between two cylindrical rollers, and then, within the bearing, by elastic expansion resume their original triangular shape in which they lie with their separated leg on the raceway of the inner bearing ring and with their closed legs brace two cylindrical rollers of the radial roller bearing against one another.

A radial roller bearing designed in this way has the disadvantage, however, that the triangular intermediate pieces arranged between the cylindrical rollers are not suitable, due to their separated leg and to their triangular shape, for withstanding high circumferential loads, but, instead, in such load situations are inclined, due to elastic deformation, to be compressed into their assembly shape or to tilt. In this bearing, too, an undesirable slip of the cylindrical rollers or the leading or trailing of the cylindrical rollers out of their desired position may thereby occur, thus leading to a jamming of the radial roller bearing, amounting to the failure of the latter. Furthermore, in this radial roller bearing, too, it has proven to be a disadvantage that the cylindrical rollers rolling on their raceways run up against the intermediate pieces arranged stationarily in relation to the cylindrical rollers, and this may result in increased frictional wear both on the cylindrical rollers and on the intermediate pieces. The wear of the intermediate pieces is further increased in that these are also permanently ground down by the cylindrical rollers on the raceway of the inner bearing ring, so that this radial roller bearing, too, has only a low useful life.

OBJECT OF THE INVENTION

Proceeding from the expounded disadvantages of the solutions of the known prior art, therefore, the object on which the invention is based is to design a radial roller bearing, in particular a cylindrical or needle roller bearing which is designed with continuous raceway rims both on the outer and on the inner bearing ring, which is formed with a simply mountable cage for the roller rolling bodies, which both withstands high circumferential loads and reduces the frictional wear between the roller rolling bodies and the cage to a minimum and also at any time ensures a reliable guidance of the roller rolling bodies and simultaneously has an impact-damping action upon the entry of the roller rolling bodies into the load zone.

DESCRIPTION OF THE INVENTION

According to the invention, in a radial roller bearing according to the preamble of claim 1, this object is achieved in such a way that the cage is formed by individual hollow rollers consisting of a shape memory alloy, which are arranged between two roller rolling bodies each and which, when the radial roller bearing is assembled, are deformed in cross section to the dimension of the free space between a rim of the outer bearing ring and a rim of the inner bearing ring and can be inserted into the radial roller bearing through the free space between these rims of the bearing rings and, after insertion into the radial roller bearing, automatically assume their original shape when a predetermined temperature is reached.

Shape memory alloys or memory alloys, as they are known, have for a long time been the subject of application-oriented material research and are distinguished in that, after suitable treatment, they change their configuration as a function of the temperature or else of pressure by virtue of a transformation from austenite to martensite. Workpieces consisting of such alloys can, in their low-temperature shape, be deformed permanently, that is to say ostensibly plastically, whereas, under heating to above the transformation temperature, they resume their original shape. When these workpieces are cooled once again, they can be deformed plastically once again, but, insofar as they are heated appropriately, resume their macroscopic original high-temperature shape by a return of their microstructure to austenite. A basic distinction can be made, in the shape memory behavior, between the one-way effect and the two-way effect. In the one-way effect, a material which has been deformed at a low temperature resumes its original shape when it has been heated to a higher temperature. The material, as it were, remembers its original shape when it is heated and also maintains this shape during subsequent cooling. By contrast, what is designated as a two-way effect is the phenomenon in which, both during a temperature rise and during cooling, the material remembers its inculcated shape, that is to say one shape at a high temperature and another shape at a low temperature.

Proceeding from this, in an expedient development of the radial roller bearing designed according to the invention, it is therefore proposed that the hollow rollers consisting of a shape memory alloy, which are designed as a cage for the roller rolling bodies, have in their original shape the same outside diameter and the same length as the roller rolling bodies of the radial roller bearing and be designed in cross section preferably with a thin-walled material thickness. The advantage of hollow rollers designed in this way and arranged between the roller rolling bodies is that both these and the roller rolling bodies roll on the raceways of the inner and of the outer bearing ring and are guided, in the same way as the roller rolling bodies, on these raceways by the rims. Owing to this and owing to the exact distance-filling fit of the hollow rollers between the roller rolling bodies, the roller rolling bodies are driven in exact alignment by the hollow rollers, so that neither the roller rolling bodies nor the hollow rollers can tilt or tip on edge. Since shape memory alloys are extremely stable in their high-temperature shape and, accordingly in their hard phase, this ensures at the same time, in spite of and because of the thin-walled design of the hollow rollers, that the hollow rollers, on the one hand, can withstand even high circumferential loads and, on the other hand, have the necessary elasticity in order to appropriately damp both the impacts occurring upon the entry of the roller rolling bodies into the load zone of the bearing and other vibrations of the roller rolling bodies.

Furthermore, as an advantageous embodiment of the radial roller bearing designed according to the invention, it is also proposed that the hollow rollers consisting of a shape memory alloy be designed preferably of a nickel/titanium alloy with a one-way or two-way characteristic which is easily deformable in its martensitic low-temperature phase and assumes its original manufacturing shape during the transition into its austenitic high-temperature phase. When a nickel/titanium alloy with a one-way characteristic is used, therefore, the hollow rollers remain in their original manufacturing shape after their transition into their austenitic high-temperature phase, so that the radial roller bearing can no longer be demounted. By contrast, the use of a nickel/titanium alloy with a two-way characteristic has the advantage that this "remembers" both its shape in the low-temperature phase and its shape in the high-temperature phase, so that, during a cooling of the radial roller bearing to the low temperature of the shape memory alloy for the purpose of demounting the radial roller bearing, the hollow rollers resume their deformed shape and can therefore easily be removed from the bearing.

An especially advantageous embodiment of a roller bearing designed according to the invention is if both the martensitic low-temperature phase and the austenitic high-temperature phase of the shape memory alloy for the hollow rollers are fixed outside the typical operating temperatures of the roller bearing. In a cylindrical roller bearing designed according to the invention, which is used, for example, as a fixed bearing for a machine tool spindle or the like, the low-temperature phase of the shape memory alloy is fixed, for example, approximately at the nitrogen boiling temperature ($-77°$ C.) and the high-temperature phase is fixed approximately at the freezing point of water ($0°$ C.), so that, when the cylindrical roller bearing is in operation, the situation is ruled out where the hollow rollers are deformed in a nondesirable way due to external temperature influences and to an associated automatic transition from the austenitic high-temperature phase of the shape memory alloy into its martensitic low-temperature phase, or vice versa. However, the respective transition temperatures of the shape memory alloy can be set individually and can thus be adapted correspondingly to the operating conditions of the roller bearing which are to be expected in each case.

Thus, the radial roller bearing designed according to the invention, with raceway rims which are continuous both on the outer and on the inner bearing ring, has the advantage, as compared with the identical radial roller bearings known from the prior art, that, by the cage for the roller rolling bodies being formed from hollow rollers consisting of a shape memory alloy, it has a simply mountable cage which both withstands high circumferential loads and, by the hollow rollers also rolling on the raceways of the bearing rings, reduces the frictional wear between the roller rolling bodies and the cage to a minimum. Simultaneously, the hollow rollers ensure at any time a reliable guidance of the roller rolling bodies in the bearing and have an impact- and vibration-damping action, by virtue of which impacts occurring upon the entry of the roller rolling bodies into the load zone of the bearing or other vibrations of the roller rolling bodies are minimized.

BRIEF DESCRIPTION OF THE DRAWINGS

A preferred embodiment of the radial roller bearing designed according to the invention is explained in more detail below with reference to the accompanying drawings, in which.

DETAILED DESCRIPTION OF THE DRAWINGS

Figure 1:
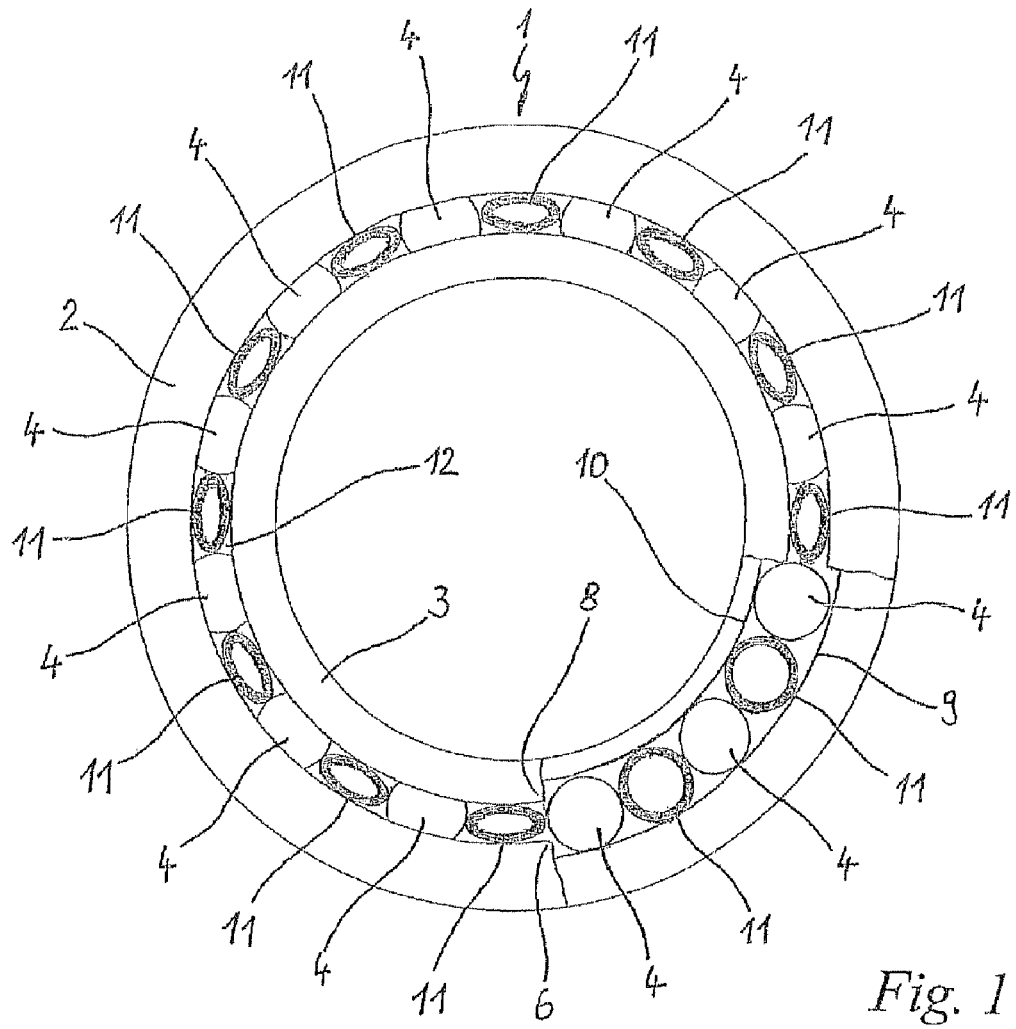
FIG. 1 shows a side view of a radial roller bearing designed according to the invention with a partial break.
Figure 2:
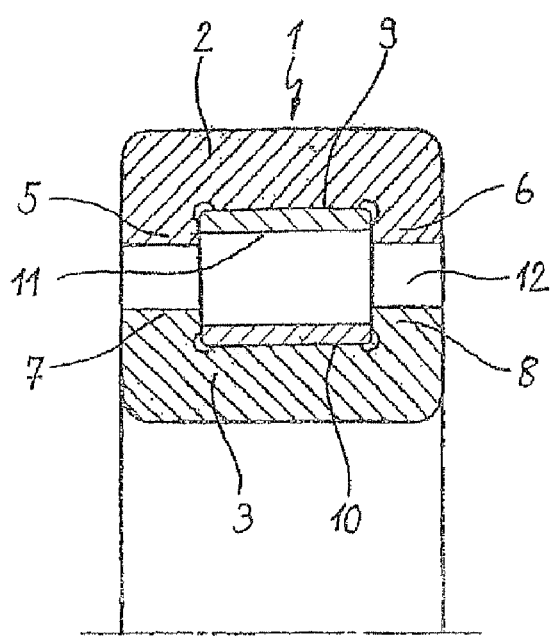
FIG. 2 shows an enlarged illustration of a partial cross section through a radial roller bearing designed according to the invention.

A radial roller bearing 1 designed as a cylindrical roller bearing is clearly apparent from FIGS. 1 and 2 and consists essentially of an outer bearing ring 2 and of an inner bearing ring 3 and also a number of roller rolling bodies 4 which are arranged between the bearing rings 2, 3 and which roll on raceways 9, 10, delimited laterally by two continuous rims 5, 6 and 7, 8, of the outer bearing ring 2 and of the inner bearing ring 3 and are guided at uniform distances from one another by means of a cage.

It is likewise apparent from FIGS. 1 and 2 that the cage of this radial roller bearing 1 is formed, according to the invention, by individual hollow rollers 11 consisting of a shape memory alloy which are arranged in each case between two roller rolling bodies 4 and which, as indicated in FIG. 1, when the radial roller bearing 1 is assembled, are deformed elliptically in cross section to the dimension of the free space 12 between a rim 6 of the outer bearing ring 2 and a rim 8 of the inner bearing ring 3 and can be inserted into the radial roller bearing 1 through the free space 12 between these rims 6, 8 of the bearing rings 2, 3. The broken partial view in FIG. 1 in this case makes it clear that these hollow rollers 11, after insertion into the radial roller bearing 1, automatically assume, when a predetermined temperature is reached, their original shape in which the hollow rollers 11 have the same outside diameter and the same length as the roller rolling bodies 4 of the radial roller bearing 1. The hollow rollers 11 are designed in cross section with a thin-walled material thickness, so that the hollow rollers 11, on the one hand, can withstand even high circumferential loads and, on the other hand, have the necessary elasticity in order to damp correspondingly both the impacts occurring upon the entry of the roller rolling bodies 4 into the load zone of the radial roller bearing 1 and other vibrations of the roller rolling bodies 4.

FIGS. 1 and 2 also reveal, merely in outlines, that the hollow rollers 11 consisting of a shape memory alloy and of a nickel/titanium alloy are designed with a two-way characteristic which is easily deformable in its martensitic low-temperature phase and assumes its original manufacturing shape during the transition to its austenitic high-temperature phase. Both the martensitic low-temperature phase and the austenitic high-temperature phase of this shape memory alloy are in this case fixed outside the typical operating temperatures of the radial roller bearing 1 in such a way that the low-temperature phase of the shape memory alloy lies at a temperature of −77° C. corresponding approximately to the nitrogen boiling temperature, while the high-temperature phase of the shape memory alloy is arranged at a temperature of 0° C. corresponding for example to the freezing point of water. When a cylindrical roller bearing designed in this way is used in the drive of a machine tool, this rules out the situation where the hollow rollers 11 are deformed in an undesirable way due to external temperature influences and to an associated automatic transition from the austenitic high-temperature phase of the shape memory alloy into its martensitic low-temperature phase, or vice versa. At the same time, such a cylindrical roller bearing is demountable again as a result of cooling to the nitrogen boiling temperature and the associated elliptic reshaping of the hollow rollers 11.

LIST OF REFERENCE NUMERALS

1 Radial roller bearing
2 Outer bearing ring
3 Inner bearing ring
4 Roller rolling body
5 Rim of 9
6 Rim of 9
7 Rim of 10
8 Rim of 10
9 Raceway of 2
10 Raceway of 3
11 Hollow rollers
12 Free space

The invention claimed is:

1. A radial roller bearing, comprising an outer bearing ring, an inner bearing ring and of a number of roller bodies arranged between the bearing rings which roll on raceways, delimited laterally by two continuous rims, of the outer bearing ring and of the inner bearing ring and guided at uniform distances from one another by means of a cage, wherein the cage is formed by individual hollow rollers of a shape memory alloy, which are arranged between two roller bodies each and which are deformed in cross section to the dimension of free space between a rim of the outer bearing ring and a rim of the inner bearing ring and inserted into the radial roller bearing through the free space between these rims of the bearing rings and, after insertion into the radial roller bearing, automatically assume their original shape when a predetermined temperature is reached.

2. The radial roller bearing as claimed in claim 1, wherein the hollow rollers consisting of a shape memory alloy, which are designed as a cage for the roller bodies, have the same outside diameter and the same length as the roller bodies of the radial roller bearing and have a cross section with a thin-walled material thickness.

3. The radial roller bearing as claimed in claim 2, wherein the hollow rollers consisting of a shape memory alloy of a nickel/titanium alloy with a one-way or two-way characteristic which is easily deformable in martensitic low-temperature phase and assumes its original manufacturing shape during the transition into austenitic high-temperature phase.

4. The radial roller bearing as claimed in claim 3, wherein both the martensitic low-temperature phase and the austenitic high-temperature phase of the shape memory alloy are fixed outside the typical operating temperatures of the radial roller bearing.

* * * * *